(12) United States Patent
Au et al.

(10) Patent No.: US 8,416,857 B2
(45) Date of Patent: Apr. 9, 2013

(54) PARALLEL OR PIPELINED MACROBLOCK PROCESSING

(76) Inventors: James Au, Richmond (CA); Kenn Heinrich, Oshawa (CA)

( * ) Notice: Subject to any disclaimer, the term of this patent is extended or adjusted under 35 U.S.C. 154(b) by 1454 days.

(21) Appl. No.: 11/693,506

(22) Filed: Mar. 29, 2007

(65) Prior Publication Data

US 2008/0240254 A1    Oct. 2, 2008

(51) Int. Cl.
   H04B 1/66    (2006.01)
   H04N 7/12    (2006.01)
   H04N 11/02   (2006.01)
   H04N 11/04   (2006.01)

(52) U.S. Cl.
   USPC ..................................................... 375/240.24

(58) Field of Classification Search .................. 375/240, 375/240.24
   See application file for complete search history.

(56) References Cited

U.S. PATENT DOCUMENTS

| | | | |
|---|---|---|---|
| 5,142,576 A | 8/1992 | Nadan | |
| 5,416,529 A | 5/1995 | Lake | |
| 5,557,332 A * | 9/1996 | Koyanagi et al. | 375/240.16 |
| 5,663,724 A | 9/1997 | Westby | |
| 5,691,768 A * | 11/1997 | Civanlar et al. | 375/240.01 |
| 5,847,771 A | 12/1998 | Cloutier et al. | |
| 5,875,305 A | 2/1999 | Winter et al. | |
| 6,285,408 B1 | 9/2001 | Choi et al. | |
| 6,369,855 B1 | 4/2002 | Chauvel et al. | |
| 6,628,702 B1 | 9/2003 | Rowitch et al. | |
| 6,887,590 B2 | 5/2005 | Zeizinger et al. | |
| 7,409,056 B2 | 8/2008 | LeBlanc et al. | |
| 7,436,903 B2 | 10/2008 | Sandhu et al. | |
| 7,843,998 B2 | 11/2010 | Bjontegaard | |
| 7,953,284 B2 | 5/2011 | Au et al. | |
| 8,369,411 B2 | 2/2013 | Au et al. | |
| 2002/0015092 A1 | 2/2002 | Feder et al. | |
| 2002/0021234 A1 | 2/2002 | Yanagiya et al. | |
| 2002/0196853 A1 | 12/2002 | Liang et al. | |

(Continued)

FOREIGN PATENT DOCUMENTS

| EP | 1 296 520 | 3/2003 |
|---|---|---|
| EP | 1 355 499 A2 | 10/2003 |

(Continued)

OTHER PUBLICATIONS

U.S. Final Office Action dated Oct. 18, 2010 cited in U.S. Appl. No. 11/693,439.

(Continued)

*Primary Examiner* — Eleni Shiferaw
*Assistant Examiner* — Jing Sims
(74) *Attorney, Agent, or Firm* — Merchant & Gould

(57) ABSTRACT

A video processing system. In a specific embodiment, the system implements a system for processing macroblocks that includes a first module for processing a macroblock. A controller provides a first macroblock to the first module and provides a second macroblock to the first module, without waiting for the first module to complete processing of the first macroblock, when information is available to the first module to process the second macroblock. The first module may implement a pipelined processor that is adapted to process macroblocks simultaneously. Alternatively, the first module includes a first engine and a second engine, which may run in parallel as parallel engines. In a more specific embodiment, an entire image frame is treated as a single slice and processed by the system via a pipelined engines or parallel engines.

19 Claims, 9 Drawing Sheets

U.S. PATENT DOCUMENTS

| | | | |
|---|---|---|---|
| 2003/0138045 A1* | 7/2003 | Murdock et al. | 375/240.12 |
| 2005/0094729 A1 | 5/2005 | Yuan et al. | |
| 2005/0196051 A1 | 9/2005 | Wong et al. | |
| 2006/0088099 A1* | 4/2006 | Gao et al. | 375/240.16 |
| 2006/0126726 A1 | 6/2006 | Lin et al. | |
| 2006/0294174 A1 | 12/2006 | Haque et al. | |
| 2008/0056350 A1 | 3/2008 | Lyashevsky et al. | |
| 2008/0075376 A1 | 3/2008 | Wilson et al. | |
| 2008/0117965 A1 | 5/2008 | Vysotsky et al. | |
| 2008/0162911 A1 | 7/2008 | Vaithianathan | |
| 2008/0240228 A1 | 10/2008 | Heinrich et al. | |
| 2008/0240233 A1* | 10/2008 | Au et al. | 375/240.02 |
| 2008/0240253 A1* | 10/2008 | Au et al. | 375/240.24 |
| 2008/0240587 A1* | 10/2008 | Au et al. | 382/236 |
| 2008/0291940 A1 | 11/2008 | LeBlanc et al. | |

FOREIGN PATENT DOCUMENTS

| | | |
|---|---|---|
| WO | WO 01/52538 | 7/2001 |
| WO | WO 2008/039321 | 4/2008 |
| WO | WO 2008/121662 A2 | 10/2008 |
| WO | WO 2008/121663 A2 | 10/2008 |
| WO | WO 2008/121664 A2 | 10/2008 |
| WO | WO 2008/121664 A3 | 10/2008 |
| WO | WO 2008/121667 A2 | 10/2008 |
| WO | WO 2008/121667 A3 | 10/2008 |
| WO | WO 2008/127855 A1 | 10/2008 |

OTHER PUBLICATIONS

European Office Action dated Dec. 17, 2010 cited in Application No. 08 732 886.0.

Mo Li et al., "A High Throughput Binary Arithmetic Coding Engine for H.264/AVC," Solid-State and Integrated Circuit Technology, 2006, 5 pgs.

Hassan Shojania et al., "A VLSI Architecture for High Performance CABAC Encoding," Visual Encoding and Image Processing, 2005, Proc. of SPIE vol. 5960, 11 pgs.

Hassan Shojania et al., "A High Performance CABAC Encoder," IEEE-NEWCAS Conference, 2005, 4 pgs.

Hendrik Eeckhaut et al., "Optimizing the critical loop in the H.264/AVC CABAC Decoder," Field Programmable Technology, 2006, pp. 113-118.

Lingfeng Li et al., "A CABAC Encoding Core with Dynamic Pipeline for H.264/AVC Mail Profile," Circuits and Systems, 2006, pp. 760-763.

Detlev Marpe et al., "Context-Based Adaptive Binary Arithmetic Coding in the H.264/AVC Video Compression Standard," IEEE Transactions on Circuits and Systems for Video Technology, vol. 13, No. 7, Jul. 2003, pp. 621-636.

Ron Wilson, "The Right Video Architecture Can Make All the Difference," Acquired at: http://www.edn.com/contents/images/6363920.pdf, Sep. 1, 2006, 9 pgs.

Wonjae Lee et al., "Pipelined Intra Prediction Using Shuffled Encoding Order for H.264/AVC," Tencon, 2006, IEEE Region Conference, 4 pgs.

Kazushi Sato et al., "Consideration on Intra Prediction for Pipeline Processing in H.264/MPEG-4 AVC," Applications of Digital Image Processing XXVII, Proceedings of SPIE, vol. 5558, 2004, pp. 485-494.

Yu-Wen Huang et al., "Hardware Architecture Design for H.264/AVC Intra Frame Coder," Circuits and Systems, 2004, pp. 269-272.

Jian-Wen Chen et al., "Introduction to H.264 Advanced Video Coding," Design Automation, Asia and South Pacific Conference on Jan. 24, 2006, pp. 736-741.

International Search Report dated Dec. 3, 2008 cited in Application No. PCT/US2008/058349.

International Search Report dated Nov. 10, 2008 cited in Application No. PCT/US2008/058335.

International Search Report dated Nov. 14, 2008 cited in Application No. PCT/US2008/058334.

International Preliminary Report dated Sep. 29, 2009 cited in Application No. PCT/US2008/058334.

European Office Action dated Feb. 11, 2010 cited in Application No. 08 732 886.0.

European Office Action dated Feb. 25, 2010 cited in Application No. 08 780 490.2.

European Office Action dated Mar. 18, 2010 cited in Application No. 08 744 419.6.

European Office Action dated Mar. 18, 2010 cited in Application No. 08 732 889.4.

U.S. Office Action dated Jul. 23, 2010 cited in U.S. Appl. No. 11/693,439.

U.S. Office Action dated Jun. 16, 2011 cited in U.S. Appl. No. 11/693,567.

U.S. Office Action dated Jun. 16, 2011 cited in U.S. Appl. No. 11/693,526.

U.S. Office Action dated Jun. 16, 2011 cited in U.S. Appl. No. 11/693,473.

Genhua Jin et al., "A Parallel and Pipelined Execution of H.264/AVC Intra Prediction," Proceedings of the Sixth IEEE International Conference on Computer and Information Technology, 2006, 6 pgs.

European Office Action dated Nov. 3, 2011 cited in Application No. 08 732 886.0, 6 pgs.

Canadian Office Action dated Jul. 4, 2011 cited in Application No. 2,682,590.

U.S. Final Office Action dated Dec. 14, 2011 cited in U.S. Appl. No. 11/693,473, 25 pgs.

U.S. Final Office Action dated Dec. 16, 2011 cited in U.S. Appl. No. 11/693,526, 21 pgs.

U.S. Final Office Action dated Dec. 29, 2011 cited in U.S. Appl. No. 11/693,567, 19 pgs.

Canadian Office Action dated Mar. 26, 2012 cited in Application No. 2,682,436, 2 pgs.

Canadian Office Action dated May 7, 2012 cited in Application No. 2,682,315, 3 pgs.

Canadian Office Action dated Jun. 21, 2012 cited in Application No. 2,682,461, 4 pgs.

Canadian Office Action dated Jan. 5, 2012 cited in Application No. 2,682,461, 3 pgs.

Canadian Office Action dated Jan. 11, 2012 cited in Application No. 2,682,449, 3 pgs.

European Office Action dated May 29, 2012 cited in Application No. 08 732 886.0, 7 pgs.

Canadian Office Action dated Jun. 4, 2012 cited in Application No. 2,682,590, 2 pgs.

European Office Action dated Feb. 13, 2013 cited in Application No. 08 780 490.2-1908, 5 pgs.

European Office Action dated Feb. 25, 2013 cited in Application No. 08 744 419.6-1908, 4 pgs.

* cited by examiner

PARALLEL OR PIPELINED MACROBLOCK PROCESSING

BACKGROUND OF THE INVENTION

This disclosure relates generally to image or video processing and more specifically relates to processing of image or video slices. Video processing systems are employed in various demanding applications, including high-definition television, missile guidance systems, and Internet video streaming. Such applications often demand compact cost-effective systems for encoding, transmitting, and decoding high quality compressed video relatively accurately, quickly, and efficiently.

Standards such as H.264 define specific ways of doing video encoding and decoding. H.264 is a digital video codec standard written by the Joint Video Team (JVT) comprising the International Telecommunication Union (ITU)—Telecommunication Standardization Sector (T) and the International Organization for Standardization (ISO)/International Electrotechnical Commission (IEC) Moving Picture Experts Group (MPEG). The H.264 standard is also called the ISO/IEC MPEG-4 Part 10 standard or the ITU-T H.264 standard.

In an example H.264 system, pixels of a video image are logically grouped into 16×16 blocks of pixels called macroblocks. Each macroblock is grouped into sixteen 4×4 blocks of pixels, called sub-blocks. The image is partitioned into horizontal bands, called slices, each containing several macroblocks. When this example H.264 system processes a slice, information from one or more previously processed macroblocks is typically required before a subsequent macroblock is processed. Similarly, when processing sub-blocks within a macroblock, information from one or more previously processed sub-blocks is typically required before a subsequent sub-block is processed. Improvements in the speed and efficiency of implementing H.264 functions such as processing macroblocks, sub-blocks, or other data can lead to a better performing, lower cost, or otherwise more desirable system or product.

DETAILED DESCRIPTION OF EXAMPLE EMBODIMENTS

Figure 1:
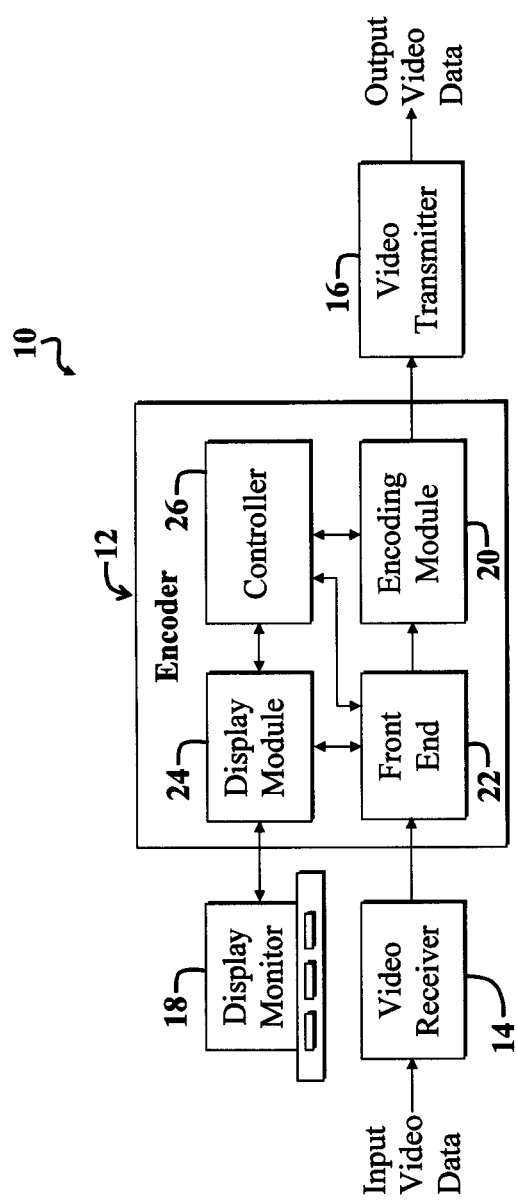
FIG. 1 illustrates an example video-encoding system.

A particular embodiment of the invention is discussed with respect to an implementation of an H.264 system. However, it should be apparent that aspects of the invention may be used to implement different standards or may be used in association in any other suitable data processing application. Nothing in the H.264 specifications should be construed as limiting the scope of the invention unless so noted. Many of the same terms that appear in the H.264 specification are used in the present specification but these terms are intended to have different meanings. For example, a macroblock may be any grouping of pixels in a frame of data. A frame may be any set of data that includes plural pixels of information, where a pixel may be a basic unit element of an image or video frame or a value associated therewith. An image frame may be any collection of data points or pixels that are associated with an image or something to be displayed or viewed. An image may be any thing or representation of a thing that can be viewed. A slice of an image frame may be any grouping of macroblocks for processing purposes.

An example of a macroblock is the macroblock discussed in the H.264 standard pertaining to Main Profile (MP) and High Profile (HiP). An example of documentation that provides details of the H.264 standard is ISO/IEC 14496-10 (ITU-T H.264), International Standard (2005), Advanced video coding for generic audiovisual services; which is hereby incorporated by reference as if set forth in full in this specification for all purposes. The macroblock includes a 16×16 group of pixels. For the purposes of generating a prediction frame, macroblocks within a slice are predicted based on previously predicted macroblocks so that values associated with one macroblock within the slice depend on values associated with one or more other macroblocks within the slice. The arrangement and size of a group of data can vary, as desired. For example, in other applications the groups can be of any dimensions and need not necessarily be square or even rectangular groupings.

An example embodiment of a system for processing macroblocks includes a first module for processing a macroblock. A controller provides a first macroblock to the first module. The controller selectively provides a second macroblock to the first module, without waiting for the first module to complete processing of the first macroblock, when information is available to the first module to process the second macroblock.

Use of this embodiment to facilitate parallel or pipelined processing of macroblocks may improve processing speeds, enabling video frames to be processed in a single slice, which may greatly increase video quality. This is unlike certain conventional video processing systems that must partition each video frame into multiple slices due to use of relatively inefficient methods, serial processing, and hardware speed and performance limitations. Furthermore, improved processing speeds may further enable construction of encoders that can perform real-time exhaustive motion search operations, which may further improve video quality.

In the present embodiment, an entire image frame is treated as a single slice, thereby yielding improved video output quality. The first module may include a pipelined processor for processing two or more macroblocks simultaneously.

A pipelined processor may be any processor that may begin processing a second portion of information without waiting for the completion of processing of a previously input first portion of information. An example pipelined processor operates on macroblocks of information back-to-back so that during a certain portion of the processing, both macroblocks are being operated on by the processor simultaneously.

Alternatively, the first module includes two engines capable of running in parallel. For the purposes of the present discussion, an engine may be any computing device, such as a processor, that is adapted to execute one or more instructions. Parallel engines may be any engines that may operate on data simultaneously. In an example set of parallel engines, the engines operate simultaneously on data that is selectively diverted between the engines, such as via a demultiplexer, from an input stream of data.

Processes implemented via the parallel engines may include intra prediction, motion-search vector computation, and so on, for a macroblock or sub-block. For the purposes of the present discussion, intra prediction may be any process wherein one or more pixels in an image frame are predicted or estimated based on information associated with or comprising the image frame. Intra prediction may include the process wherein values for a predicted macroblock in a given frame are predicted or ascertained from one or more other macroblocks within the frame. A motion-search vector may be any value or set of values that contain information pertaining to the movement or projected movement of information in an image frame.

Hence, unlike a conventional system that must process macroblock rows serially via a single engine, certain embodiments discussed herein enable use of multiple engines to process macroblocks within a slice of an image frame. This may result in improved encoder performance, image quality, and so on.

For clarity, various well-known components, such as power supplies, H.264 decoders, computer systems, daughter cards, audio encoders, hosts, user interfaces, scaling circuits, timing clocks, and so on, have been omitted from the figures. However, those skilled in the art with access to the present teachings will know which components to implement and how to implement them to meet the needs of a given application.

FIG. 1 illustrates an example video-encoding system 10. The encoding system 10 includes an encoder 12, which receives video input from a video receiver 14 and provides resulting compressed video to a video transmitter 16. For illustrative purposes, the encoder 12 is shown communicating with a display 18 for displaying video frames. Processed video frames may be routed from an encoding module 20 to a display module 24 through a controller 26.

The encoder 12 includes the encoding module 20, a front end 22, the display module 24, and the controller 26. The front end 22 communicates with the video receiver 14, the encoding module 20, the display module 24, and the controller 26. The encoding module 20 further communicates with the controller 26. The display module 24 further communicates with the controller 26 and the display monitor 18.

In operation, the front end 22 formats input from the video receiver 14, such as by performing look-ahead delay functions. The resulting formatted video input is accessible by the display module 24 and the encoding module 20. The controller 26 provides control input to the display module 24, the front end 22, and the encoding module 20 to facilitate controlling the operation of the encoder 12. Input video may be displayed via the display monitor 18 after the video data is formatted and prepared as needed via the display module 24.

In the present example embodiment, the encoding module 20 compresses input video in accordance with one or more H.264 standards and via a parallel processing scheme, as discussed more fully below. Parallelism in processing can be achieved by any manner known in the art such as by using multiple processors, pipelined stages, etc. Example processing functions that may be implemented via the encoding module 20 include inter prediction, intra prediction, exhaustive motion search, mode decision, frequency transforms, quantization, dequantization, frame subtraction and addition, filtering, and entropy coding for video image frames. The encoding module 20 outputs resulting compressed video to the video transmitter 16. The video transmitter 16 may then transmit the resulting video to a decoder, to memory, and so on, as needed for a particular application.

The encoding module 20 may be implemented to perform processing which is in accordance with H.264 standards. In general, any technologies or design approaches can be used to implement the functionality of the modules or other parts of the system. For example, Field Programmable Gate Array (FPGA), Digital Signal Processor (DSP), custom, semi-custom, general purpose processing, etc., technologies may be employed.

Figure 2:
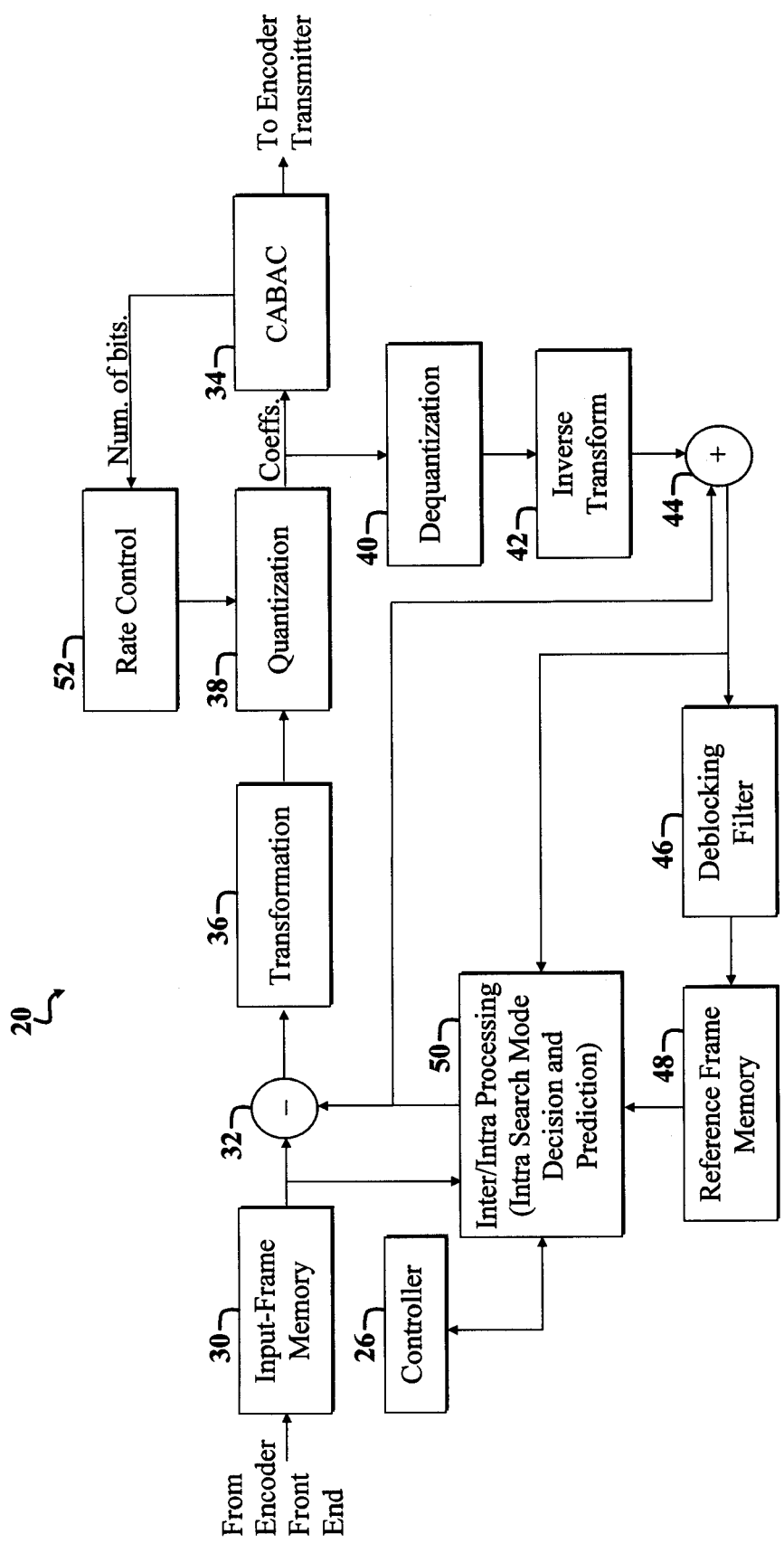
FIG. 2 is a more detailed diagram illustrating example components of the encoding module included in the video-encoding system of FIG. 1.

FIG. 2 is a more detailed diagram illustrating example components 30-52 of the encoding module 20 included in the video-encoding system 10 of FIG. 1. The encoding module 20 includes an input-frame memory 30 for receiving and selectively storing video frames from the front end 22 of FIG. 1. The output of the input-frame memory 30 is input to a subtracter 32 and to an inter/intra processing module 50. The subtracter 32 also receives input from the inter/intra processing module 50 and provides output to a transformation module 36. An output of the transformation module 36 is coupled to a quantization module 38, also called a quantizer, an output of which is coupled to inputs of a dequantization module 40 and a entropy encoder 34.

In the present example embodiment, the entropy encoder 34 implements Context Adaptive Binary Arithmetic Coding (CABAC) in accordance with H.264 MP or HiP, and consequently, is also called a CABAC module. The CABAC module 34 provides feedback to a rate control module 52, which provides a rate-control signal to the quantizer 38.

The dequantizer 40 is further coupled to an inverse transform module 42, an output of which is coupled to an input of an adder 44. An output of the adder 44 is coupled to an input of a deblocking filter 46. An output of the deblocking filter 46 is coupled to an input of a reference frame memory 48. An output of the reference frame memory 48 is coupled to an input of the inter/intra processing module 50. An output of the inter/intra processing module 50 is coupled to an input of the subtracter 32 and to an input of the adder 44.

In operation, an input frame from the input-frame memory 30 is provided to the inter/intra processing module 50 and to the subtracter 32. The frame is processed by the encoding module 20 in units of macroblocks. Each macroblock is encoded so-called inter mode or intra mode. In inter mode, the inter/intra processing module 50 executes one or more instructions to facilitate forming a prediction frame based on a previously reconstructed and filtered frame, called a reference frame, which is provided to the inter/intra processing module 50 by the reference frame memory 48. The inter/intra processing module 50 may also implement inter/intra search, mode-decision, and other functions. Details of inter/intra search and mode-decision operations that are known in the art may be readily adapted for use with example embodiments by those skilled in the art, without undue experimentation.

Reference frames used for inter prediction have been filtered by the deblocking filter 46. The inter/intra processing module 50 employs a first feedback loop formed by the inter/intra processing module 50, the subtracter 32, the transformation module 36, the quantization module 38, the dequantizer 40, the inverse transform module 42, the adder 44, the deblocking filter 46, and the reference frame memory 48 to facilitate generating a motion-compensated predicted frame from one or more reference frames.

In intra mode, the inter/intra processing module 50 executes one or more instructions to facilitate forming a prediction frame based on the current frame, as opposed to a reference frame. In intra mode, the inter/intra processing module 50 employs a second feedback loop that includes the inter/intra processing module 50, the subtracter 32, the transformation module 36, the quantizer 38, the dequantizer 40, the inverse transform 42, and the adder 44 to facilitate computing a reconstructed prediction frame.

In either mode, a predicted macroblock output by the inter/intra processing module 50 is subtracted from the corresponding macroblock in the input frame that is output from the input-frame memory 30. The resulting macroblock is called a residual or difference macroblock. The difference macroblock is then transformed from a time domain to a frequency domain, such as via a block transform, by the transformation module 36. The resulting transformed macroblock is quantized by the quantizer 38; dequantized by the dequantizer 40; and then transformed back to the time domain via the inverse transform module 42. The resulting residual macroblock is added to a corresponding macroblock from the prediction frame that is output from the inter/intra processing module 50 before the resulting added macroblock, called a reconstructed macroblock, is input back to the inter/intra processing module 50 as a reconstructed macroblock.

The output of the quantizer 38 represents a set of quantized transform coefficients, also called residuals. These coefficients are then entropy encoded via the CABAC 34. Entropy encoded coefficients and information required to decode a macroblock, such as prediction mode, quantizer step size, motion vector information, motion-compensation information, and so on, are output from the CABAC 34 via one or more bitstreams. The number of bits employed by the CABAC during a given operation may be fed back to the rate control module 52 to facilitate controlling the amount of information removed by the quantizer, thereby controlling the final bit rate.

Hence, the rate control module 52 generates rate control signals to control the quantizer 38 and accompanying quantization parameters based on bit-production feedback from a previous frame, picture complexity, current bit buffer levels. The inter/intra processing module 50 may facilitate performing prediction through motion search and intra search mode-decision operations; may implement a mode decision function that selects a best prediction mode for each macroblock to be processed; and may perform prediction via motion compensation or intra compensation to form sample intensity predictions. The terms "intra compensation" and "intra prediction" may be employed interchangeably herein. Intra compensation includes predicting at least a portion of a macroblock based on information from the current frame in which the macroblock is a part.

The subtracter 32 outputs residuals representing differences between input data samples from the input-frame memory 30 and prediction samples from the inter/intra processing module 50. The transform module 36 converts residuals to the frequency domain. The quantizer 38 quantizes frequency coefficients, effectively discarding certain information to reduce entropy in the residuals. The dequantizer 40 and inverse transform module 42 are adapted to reconstruct transformed and quantized residuals through dequantization and inverse transform processes. The adder 44 facilitates adding reconstructed residuals output from the inverse transform module 42 to prediction samples output from the inter/intra processing module 50 to reconstruct decoded samples for a given macroblock. The deblocking filter 46 is adapted to remove blocking artifacts from decoded samples output from the adder 44. The CABAC 34 is adapted to implement entropy coding in accordance with H.264 MP and HiP profiles. The CABAC 34 codes macroblock modes, prediction information, and residuals into H.264-compliant bitstreams.

For illustrative purposes, the controller 26 is shown communicating with the inter/intra processing module 50. The controller 26 may communicate with more modules, different modules, or no modules in FIG. 2 without departing from the scope of the present teachings. Furthermore, the controller 26 may be separated into different controllers positioned in different locations in the encoder 20. Furthermore, the rate-control module 52 and the controller 26 may be implemented in a common control module without departing from the scope of the present teachings.

Example embodiments discussed more fully below pertain primarily to intra prediction mode and corresponding components within the inter/intra processing module 50 for implementing intra prediction mode, which may include facilitating performing intra prediction and implementing an exhaustive motion search, and so on, wherein one or more motion search vectors are computed for each macroblock. However, those skilled in the art with access to the present teachings may readily adapt embodiments disclosed herein to accommodate inter prediction mode without undue experimentation and without departing from the scope of the present teachings.

For the purposes of the present discussion, a motion search vector may be any value or set of values that contain information pertaining to the movement or projected movement of information or values in an image frame.

Figure 3:
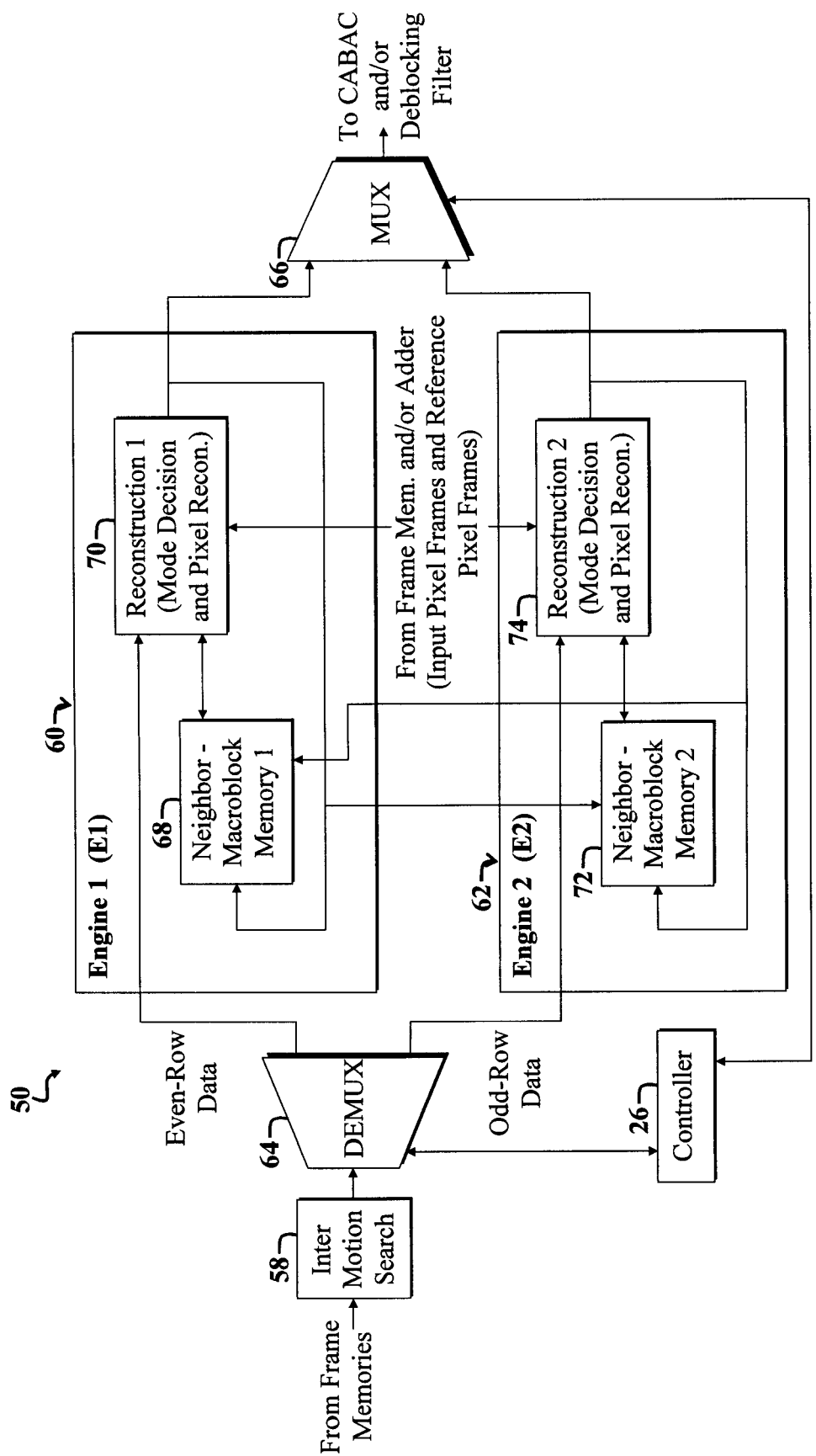
FIG. 3 is a more detailed diagram illustrating example components of the inter/intra processing module of the encoding module of FIG. 2 and used for parallel processing of macroblocks of a video image frame.

FIG. 3 is a more detailed diagram illustrating example components of the inter/intra processing module 50 of the encoding module 20 of FIG. 2 that are used for parallel processing of macroblocks of a video image frame. The inter/intra processing module 50 includes an inter motion search module 58, which receives input from one or more frame memories, such as the frame memories 30, 48 of FIG. 2, and provides vectors and motion costs for even and odd macroblock rows to an input demultiplexer (DEMUX) 64. The inter/intra processing module 50 further includes output multiplexer (MUX) 66, which control inputs and outputs, respectively, to a first engine 60, and a second engine 62. The DEMUX 64 and the MUX 66 may be considered as part of a controller that includes the controller 26. The first engine 60 includes a first reconstruction module 70 and a first neighbor-macroblock block 68 memory. Similarly, the second engine 62 includes a second reconstruction block 74 and a second neighbor-macroblock memory 72.

With reference to FIGS. 2 and 3, the input DEMUX 64, which acts as a selector, receives image frame information, including vectors and motion costs for even and odd macroblock rows, from one or more of the frame memories 30, 48 and/or the adder 44 of FIG. 2. A first output of the DEMUX 64, which represents even-row data, is input to the first reconstruction module 70 of the first engine 60. A second output of the DEMUX 66, which represents odd-row data, is input to the second reconstruction block 74 of the second engine 62.

The first reconstruction engine 70 receives additional input from the first neighbor-macroblock memory 68 and the reference frame memory 48 and/or the adder 44 of FIG. 2. Note that various intervening modules, such as delay circuits, control and decision logic, and so on, may be inserted between various modules, such as the adder 44 and inter/intra processing module 50 of FIG. 2, without departing from the scope of the present teachings. In general, any suitable circuit and architecture designs can be used to implement the functions described herein. An output of the first reconstruction module 70 is input to the output MUX 66 and is also fed back as input to the first neighbor-macroblock memory 68 and the second neighbor-macroblock memory 72.

Similarly, an output of the second reconstruction module 74 is fed back to the second neighbor-macroblock memory 72 and the first neighbor-macroblock memory 68. The second reconstruction module 74 receives odd-row data input from the input DEMUX 64; receives input from the second neighbor-macroblock memory 72; and receives input from the reference frame memory 48 and/or the adder 44 of FIG. 2. The output of the MUX 66 represents reconstructed pixels, which correspond to reconstructed macroblocks, which will correspond to a reconstructed frame, called a prediction frame. The output of the MUX 66 may also include modes and vectors associated with each macroblock as needed for a particular implementation.

For illustrative purposes, the controller 26 is shown communicating with the DEMUX 64 and the MUX 66. The controller 26 is adapted to control the timing and switching of the DEMUX 64 and MUX 66 based on predetermined timing criteria. Those skilled in the art with access to the present teachings may readily implement timing modules or other control modules to meet the needs of a given implementation without undue experimentation. While the controller 26 is shown as the same controller 26 employed in FIGS. 1 and 2, the controller 26 of FIG. 3 may be implemented via a different controller without departing from the scope of the present teachings.

For clarity, the operation of the inter/intra processing module 50 of FIG. 3 is discussed below primarily with respect to intra prediction operations. However, those skilled in the art with access to the present teachings may readily employ the inter/intra processing module 50 to implement inter prediction in addition to or instead of intra prediction without undue experimentation. With reference to FIGS. 2 and 3, note that functionality associated with the feedback loop formed by the modules 32-36-38-40-42-44 of FIG. 2 is incorporated in the reconstruction modules 70, 74 of FIG. 3. The results of the feedback loop included in the reconstruction modules 70, 74 are shared between the first engine 60 and the second engine 62 and are stored in the neighbor macroblock memories 68, 72. Associated outputs from the reconstruction modules 70, 74, which include residual coefficients, may be input to the deblocking filter 46 and/or the CABAC module 34 of FIG. 2 along with other data as needed to meet the needs of a given implementation.

Figure 4:
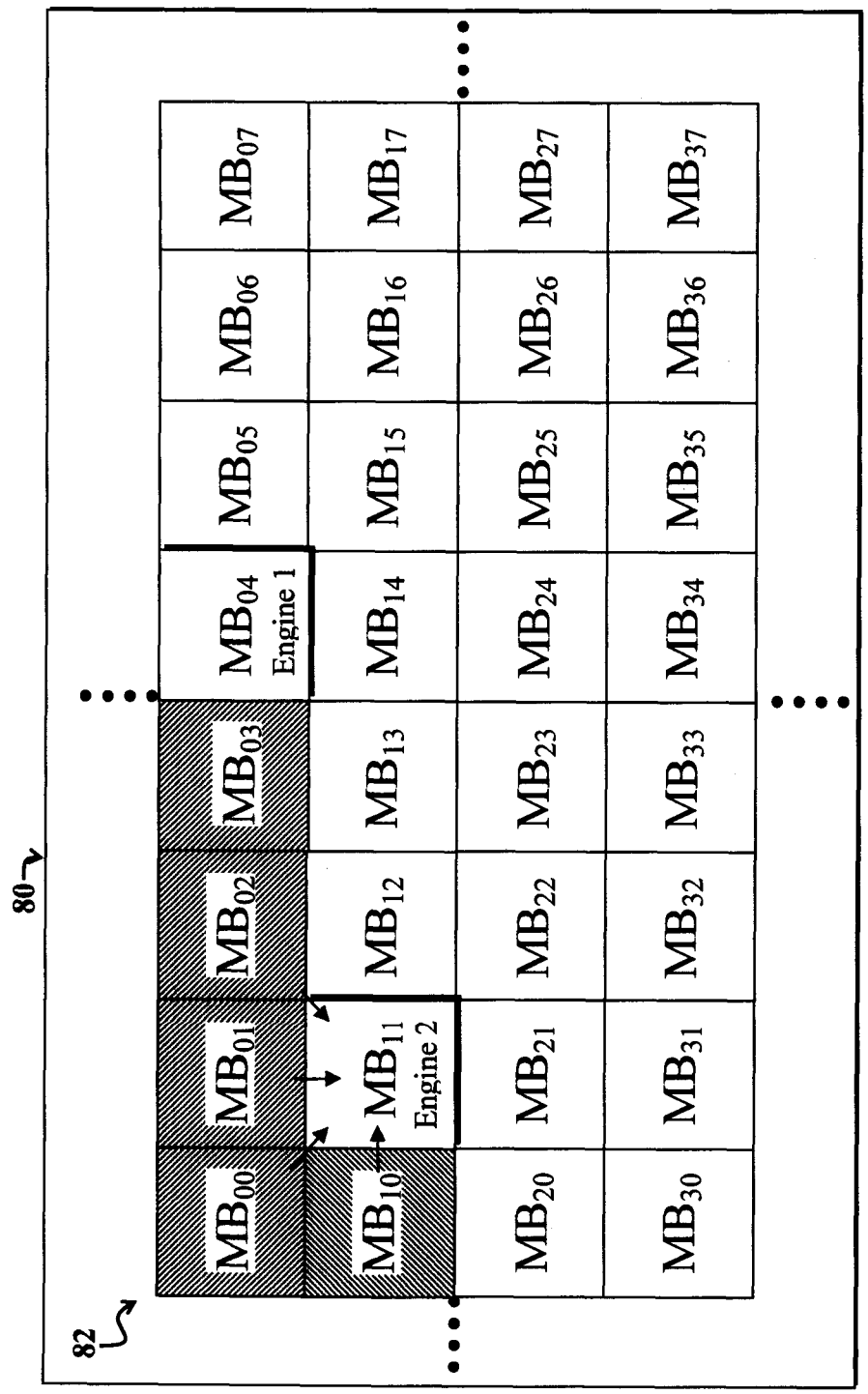
FIG. 4 is a diagram illustrating parallel processing of macroblocks in a portion of a video image frame as implemented via the inter/intra processing module of FIG. 3.

FIG. 4 is a diagram illustrating parallel processing of macroblocks 82 in a portion of a video image frame 80, as implemented via the inter/intra processing module 50 of FIG. 3.

In operation, with reference to FIGS. 3 and 4, the DEMUX 64 provides row 0 (denoted in FIG. 4 by the MacroBlocks (MBs) with an initial 0 subscript, e.g., $MB_{0x}$), which is an even macroblock row, to the first engine 60, which processes the first four macroblocks ($MB_{00} \rightarrow MB_{03}$) of row 0 before the second engine 62 begins processing macroblocks ($MB_{00}$, $MB_{01}$, etc.) in row 1, which are selectively input to the second engine 62 via the DEMUX 64. A preferred embodiment uses a broadcast approach where each macroblock is tagged with an identifier for an engine. Each engine receives all macroblocks but a macroblock is only processed by an engine if the macroblock is identified for the engine. Other designs can use different approaches to control macroblock processing among engines. Note that the DEMUX 64 and MUX 66 of FIG. 3 may be implicit logical blocks that are representative of operations or logical functions and not necessarily representative of physical modules. For example, the DEMUX 64 may be implemented via the broadcast approach as indicated above, which may obviate the need for a particular physical DEMUX module.

In the present example embodiment, when the first engine 60 is processing $MB_{04}$ in row 0, the second engine 62 is processing $MB_{11}$ in row 1. The processing of $MB_{11}$ by the second engine 62 employs information from previously processed macroblocks, including macroblocks ($MB_{00} \rightarrow MB_{02}$) processed by the first engine 60 in row 0 and $MB_{10}$ processed by the second engine 62 in row 1. The requisite information pertaining to the previously processed macroblocks is maintained in the second macroblock memory 72 of FIG. 3. The macroblock processing operations include mode decision, pixel reconstruction and prediction operations. However, in other implementations different numbers or types of operations can be used.

In the present example embodiment, the second engine 62 does not begin processing $MB_{11}$ until the first engine (E1) 60 completes processing $MB_{03}$; the second engine (E2) 62 does not begin processing $MB_{10}$ until the first engine 60 completes processing $MB_{02}$ is processed, and so on. However, in certain implementations, the second engine 62 starts on row 1 while the first engine 60 starts processing $MB_{02}$, so that the engines are more closely staggered by a time interval corresponding to the time required to process one macroblock. Note that time at which the second engine 62 starts on the next odd row of macroblocks (row 3) depends on when the first engine completes processing of requisite pixels of the requisite macroblocks ($MB_{20} \rightarrow MB_{22}$) in row 2.

In the present example embodiment, the inter/intra processing module 50 and accompanying reconstruction modules 70, 74 employ one or more external TQR (Transform Quantization Reconstruction) loops (e.g., loop 32, 36, 38, 40, 42, 44) of the encoder of FIG. 2 to facilitate reconstructing a macroblock. However, alternatively, requisite TQR loops may be incorporated within the reconstruction modules 70, 74 without departing from the scope of the present teachings.

Certain conventional implementations of inter/intra processing modules fail to recognize or otherwise capitalize on the specific nature of the interdependencies of the macroblocks 82 to facilitate parallel processing of macroblocks within a single slice of a video frame.

Figure 5:
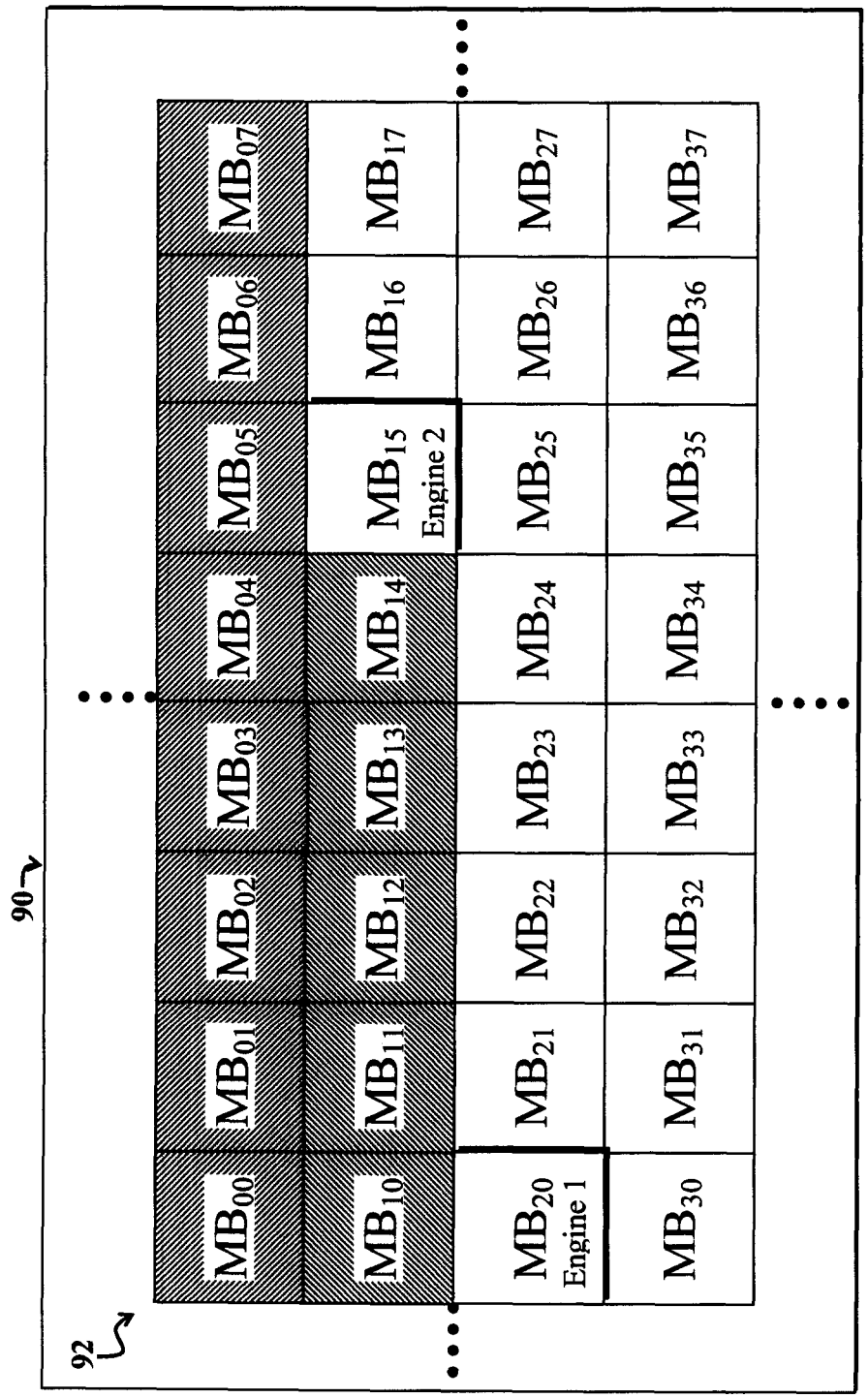
FIG. 5 is a diagram illustrating parallel processing of a video frame when the parallel video processing engines of the inter/intra processing module of FIG. 3 process macroblocks near the end of a row of macroblocks.

FIG. 5 is a diagram illustrating parallel processing of a video frame 90 when the parallel video processing engines 60, 62 of the inter/intra processing module 50 of FIG. 3 process macroblocks near the end of a row of macroblocks. When the first engine 60 completes processing of row 0, and the second engine 62 has processed sufficient macroblocks above row 2 to enable processing of the first macroblock $MB_{20}$ in row 2, the first engine 60 starts processing macroblocks in row 2, starting with $MB_{20}$. Similarly, by the time the second engine 62 completes processing of macroblocks in row 1, the first engine will have processed sufficient macroblocks in row 2 to enable the second engine 62 to begin processing the next odd row, i.e., row 3. Hence, each engine 60, 62 selectively skip rows so that the first engine 60 processes even rows, while the second engine processes odd rows.

While FIGS. 3-5 have been discussed with respect to two engines 60, 62 selectively operating in parallel once certain macroblock dependencies or criteria are met, a single pipelined engine may be employed without departing from the scope of the present teachings.

For example, with reference to FIG. 3, the second engine 62 may be removed or disabled, and both even and odd macroblock row data fed to the first engine 70, which has been configured to operate as a pipeline. Once a predetermined number of macroblocks in row 0 have been processed, macroblocks from row 1 may be fed into the engine 60 directly after macroblocks from row 0 in a pipelined fashion. Hence, with reference to FIGS. 3 and 5, the resulting pipelined engine 60 would be simultaneously processing $MB_{15}$ and $MB_{20}$ back-to-back, such that processing on $MB_{20}$ begins before processing on $MB_{15}$ completes.

While the embodiments of FIGS. 3-5 have been discussed with respect to two parallel engines and a pipelined engine, note that more than two engines may be employed, or a pipelined engine wherein more than two macroblocks are processed simultaneously, may be employed without departing from the scope of the present teachings. For example, with respect to FIG. 4, a third engine may start processing row 2 when sufficient macroblocks in row 1 have been processed by the second engine 62. The first engine 60 would then jump to processing row 3 upon completion of processing row 0, instead of jumping to row 2. In a related pipelined implementation, three macroblocks could be fed back-to-back into the first engine 60 at any given time.

While the macroblocks 82, 92 are shown spatially related in rows, other types of related macroblocks may be operated on via plural engines or via one or more pipelined engines. For example, macroblocks may exhibit row pair relationships, as discussed more fully below. Furthermore, the relationships between macroblocks need not be spatial relationships. For example, embodiments discussed herein may be adapted to simultaneously process any sequence of related macroblocks such that one engine may start processing certain macroblocks of the sequence after certain predetermined dependencies (or dependency) of the processing status of one or more other macroblocks are satisfied.

Hence, certain embodiments discussed herein enable use of multiple engines or one or more pipelined engines to process macroblocks within a slice of an image frame.

Figure 6:
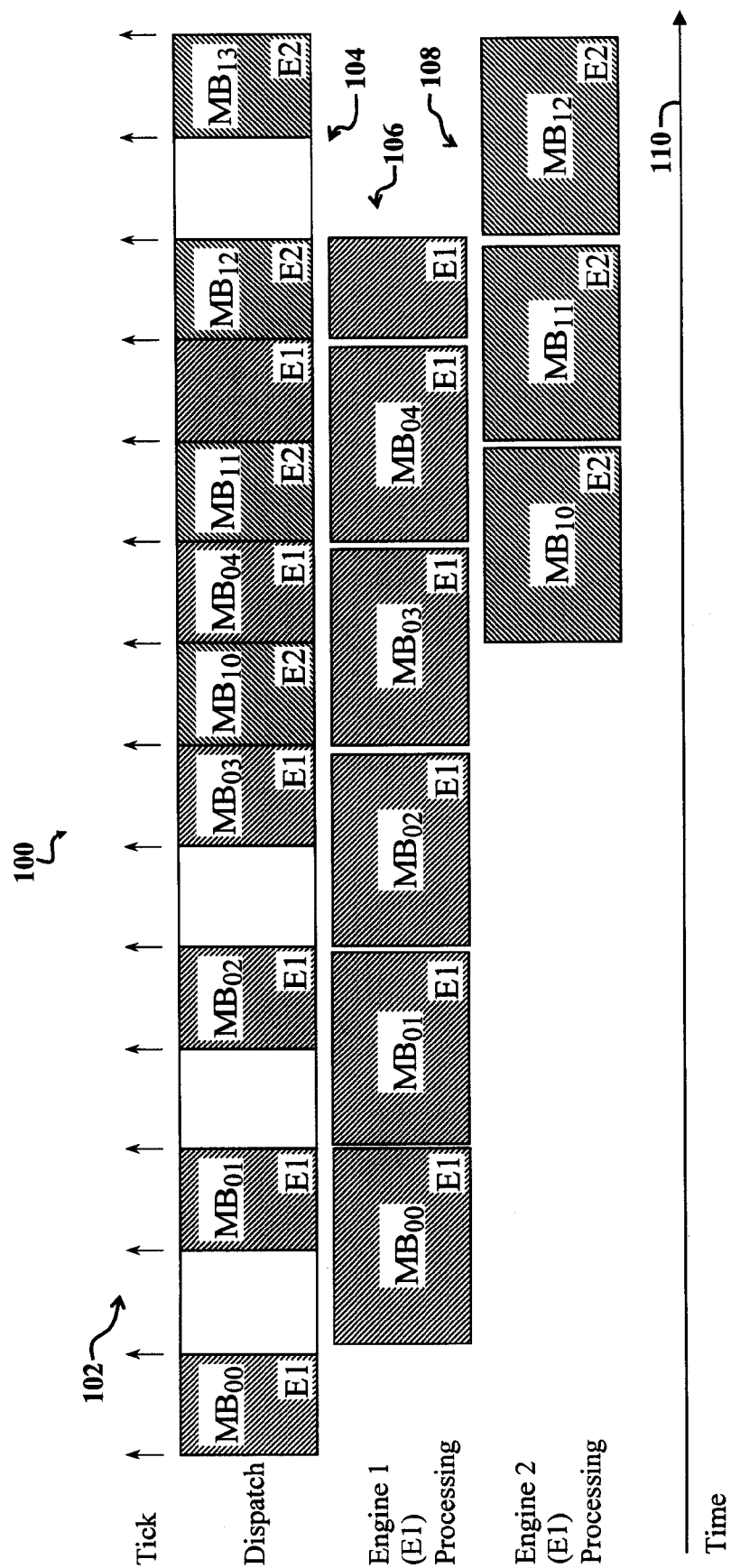
FIG. 6 is a timing diagram illustrating when certain macroblocks of FIGS. 4 and 5 are processed by the parallel video processing engines of FIG. 3.

FIG. 6 is a timing diagram 100 illustrating when certain macroblocks of FIGS. 3 and 5 are processed by the parallel video processing engines 60, 62 of FIG. 3. The example timing diagram 100 illustrates microscopic timing, also called packet-by-packet timing, when the engines 60, 62 of FIG. 3 are encoding macroblocks that are associated with image information such as a portion of a picture, frame, or field Progressive pictures may represent video comprising successively played still frames, wherein portions of each frame are scanned sequentially from top to bottom by an accompanying encoder, decoder, or display system.

With reference to FIGS. 3-6, the timing diagram 100 includes a horizontal time axis 110 along which is plotted a row of clock ticks 102; a dispatch row 104 illustrating when information associated with certain macroblocks ($MB_{00} \rightarrow MB_{13}$) is dispatched to the first engine 60 or the second engine 62; a first engine-processing row 106 illustrating when the first engine 60 processes information associated with certain macroblocks ($MB_{00} \rightarrow MB_{04}$); and a second engine-processing row 108 illustrating when the second engine 62 processes information associated with certain macroblocks ($MB_{10} \rightarrow MB_{12}$).

Initially, uncompressed and unencoded image information (also referred to as "unprocessed macroblocks" e.g., $MB_{00} \rightarrow MB_{03}$) are dispatched from a frame memory, such as via the DEMUX 64 and controller 26, to the first engine 60 on alternate clock pulses, also called clock ticks 102. After the first macroblock ($MB_{00}$) is dispatched to the first engine 60, the first engine 60 begins processing $MB_{00}$, as shown in the first engine-processing row 106. The first engine 60 takes approximately two intervals between ticks 102 to process $MB_{00}$.

After the fourth macroblock $MB_{03}$ is dispatched to the first engine 60, the first engine 60 begins processing $MB_{03}$ and has completed processing $MB_{02}$. Consequently, all processed macroblocks ($MB_{00} \rightarrow MB_{02}$) needed by the second engine 62 to process $MB_{10}$ have been processed by the first engine 60 at this point. Consequently, the second engine 62 is activated, and macroblocks are dispatched to the first engine 60 and the second engine 62 on successive clock ticks.

Approximately midway through the processing of $MB_{03}$, as indicated in the first-engine processing row 106, the second engine 62 receives and begins processing $MB_{10}$, as indicated in the second-engine processing row 108. At this point, the first engine 60 and the second engine 62 are operating on different macroblocks simultaneously.

The diagram 100 also applies in a canonical or pipelined scenario, wherein the first engine 60 is a pipelined processor, as discussed above. In this case, the pipelined processor, i.e., first engine 60 operates on $MB_{03}$ and $MB_{10}$ simultaneously, as illustrated in the timing diagram 100 of FIG. 6. The timing pattern continues as shown in FIG. 6 for the dispatching and processing of macroblocks, when the inter/intra processing module 50 is in either a parallel processing mode, wherein both engines 60, 62 are operated, or in a pipelined mode, wherein one of the engines 60, 62 is not employed and the other is employed as a pipelined processor.

Figure 7:
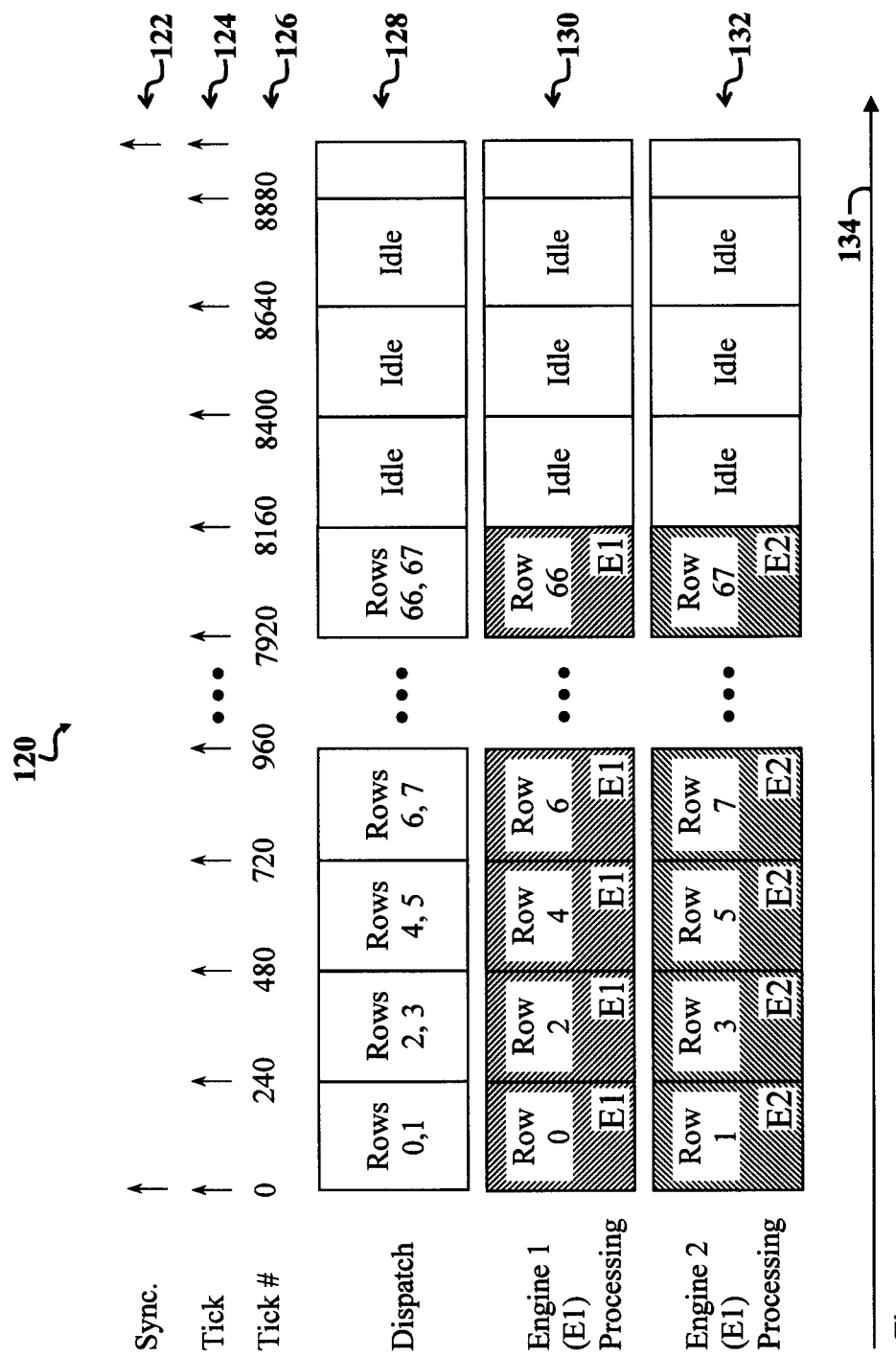
FIG. 7 is a timing diagram illustrating when certain rows of a video image frame are processed by the parallel video processing engines of FIG. 3.

FIG. 7 is a frame-level timing diagram 120 illustrating when certain rows of a video image frame, such as the frame 90 of FIG. 5, are processed by the parallel video processing engines 60, 62 of FIG. 3. The frame-level timing diagram 120 includes a horizontal time axis 134 on which is plotted a row of synchronization clock ticks 122, a row of dispatching ticks 124, a tick-number row 126, a dispatch row 128, a first-engine row 130, and a second-engine row 132.

After a frame is synchronized, such as via one of the synchronization ticks 122, subsequent clock ticks coincide with the dispatching of macroblock row pairs to the inter/intra processing module 50 of FIGS. 2 and 3. Note that even rows are dispatched to the first engine 60 while odd rows are dispatched to the second engine 62 of FIG. 3. Furthermore, note that the processing of even and odd rows occurs approximately in parallel or back to back.

The processing of one row relative to the subsequent row is selectively offset so that processing dependencies in a previous row are met to enable processing of macroblocks in a subsequent row. This offset, which is not shown in FIG. 7, also facilitates pipelined implementations of embodiments discussed herein.

Figure 8:
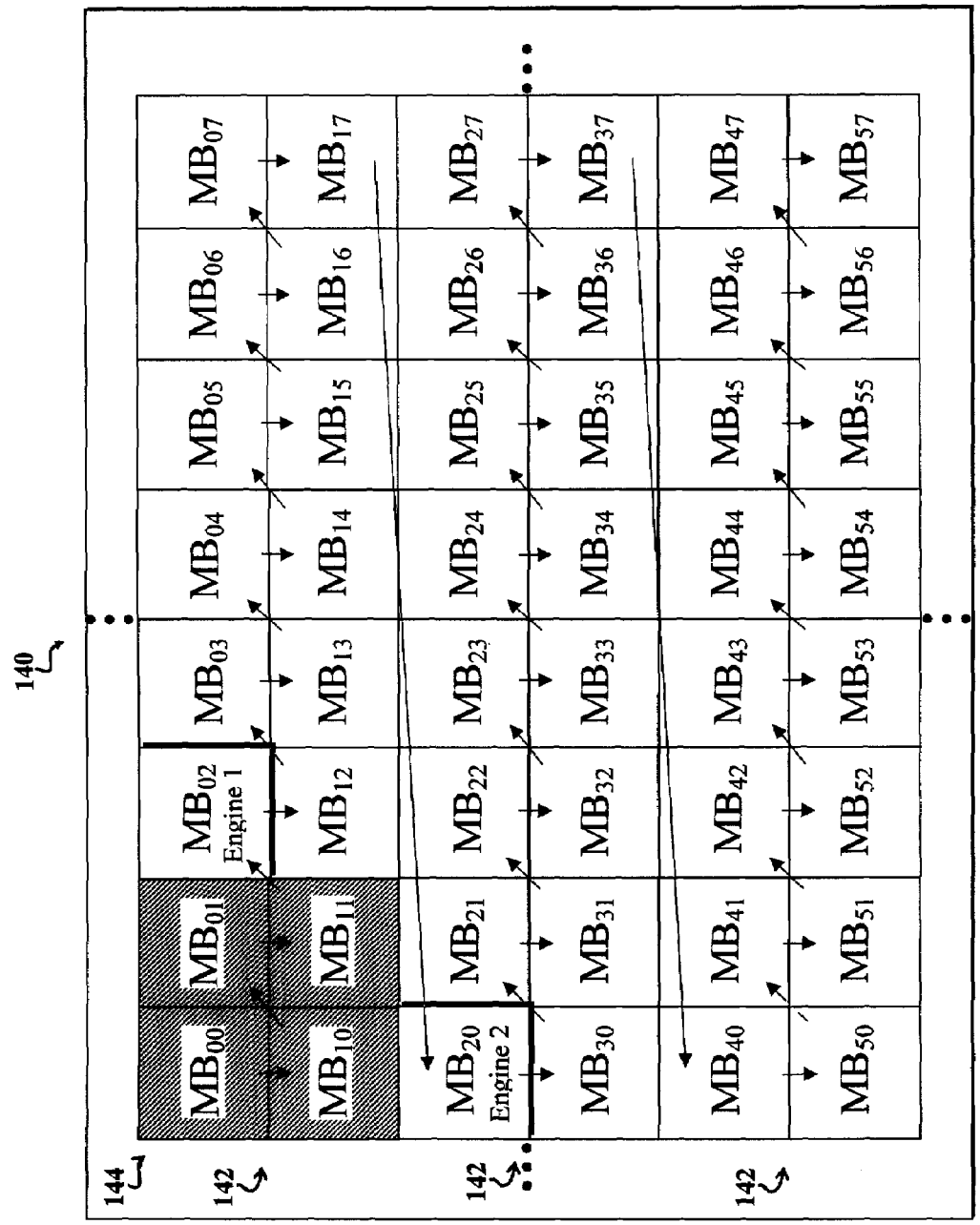
FIG. 8 is a diagram illustrating an alternative example of parallel processing of row pairs of macroblocks of an image frame via the parallel video processing engines of FIG. 3 when operating in an alternative operational mode.

FIG. 8 is a diagram illustrating an alternative example of parallel processing of row pairs 142 of macroblocks of an image frame via the parallel video processing engines 60, 62 of FIG. 3 when operating in an alternative operational mode.

For the purposes of the present discussion, a row of macroblocks may be any collection of macroblocks that are adapted to be displayed horizontally and adjacent to each other. A row pair of macroblocks may be any two bands of macroblocks, where each band is one macroblock deep, and wherein the two bands are spatially adjacent or otherwise related for data processing purposes. A band of macroblocks may be any collection of inter-related macroblocks. An example of inter-related macroblocks include macroblocks that are spatially adjacent and therefore spatially related. A row and row pair of macroblocks are examples of bands of macroblocks.

Row pairs of macroblocks are employed in MacroBlock Adaptive Frame-Field (MBAFF) implementations. In such implementations, row pairs of macroblocks are coded in a zigzag pattern as shown in FIG. 8. Accordingly, coding order is not a straight linear left to right pattern. Rows of macroblocks 142 are coded as interleaved. For example, row 0 is interleaved with row 1; row 2 is interleaved with row 2, and so on.

In the present example, with reference to FIGS. 3 and 8, macroblocks 144 of the frame 140 are assigned to the first engine 60 and the second engine 62 in adjacent row pairs. The second engine 62 begins operating on the second row pair (rows 2 and 3) after the first engine 60 has processed $MB_{00}$, $MB_{01}$, $MB_{10}$, and $MB_{11}$ so that sufficient information to process $MB_{20}$ is available to the second engine 62.

Hence, the first engine 60 codes the first row pair (rows 0 and 1), and the second engine codes the next row pair (rows 2 and 4) in alternation, and so on. In general, the first engine 60 processes rows $4k$ and $4k+1$, while the second engine 62 processes rows $4k+2$ and rows $4k+3$, wherein k is an integer between zero and (number of macroblock rows)/4−1. Accordingly, in a frame with 64 macroblock rows and 34 row pairs, each engine processes 17 row pairs of macroblocks.

For clarity, detailed measurements or estimates of transfer time between engines 60, 62 is not accounted for in the present discussion. However, those skilled in the art with access to the present teachings may readily analyze and adjust timing as needed to meet the needs of a given application without undue experimentation.

An extra two macroblock ticks is considered for passing results between the engines 60, 62 and corresponds to the interval after the first engine 60 has completed the first row-pair as shown in the transfer schedule of Table 1 below. The numbers in the table below, e.g., 00, 11, 01, correspond to macroblock subscripts indicating associated rows and column positions of the associated macroblock.

TABLE 1

| | Time Slot (2 MB ticks each slot) | | | | | | | |
|---|---|---|---|---|---|---|---|---|
| | k + 0 | k + 1 | k + 2 | k + 3 | k + 4 | k + 5 | k + 6 | k + 7 | k + 8 |
| E1 | 00 | 10 | 01 | 11 | 02 | 12 | | | |
| E1→E2 Send | | 00 | 10 | 01 | 11 | 02 | 12 | | |
| E2 | | | | | | 20 | 30 | 21 | 31 |
| E2→E1 Send | | | | | | | 20 | 30 | 21 |

Note that the second engine 62 starts on the second row pair (rows 2 and 3) only after $MB_{11}$ is processed by the first engine 60. Similarly, the second engine 62 would start on the fourth row pair (not shown) when the first engine 60 has completed processing of $MB_{51}$.

Assuming a transfer latency between engines 60, 62 of TL (nominally 1) macroblocks, the start time offset (T(E2)) of the second engine 62 is the sum four blocks in the second row, plus the transfer latency, i.e., T(E2)=4+TL clock tick intervals.

Figure 9:
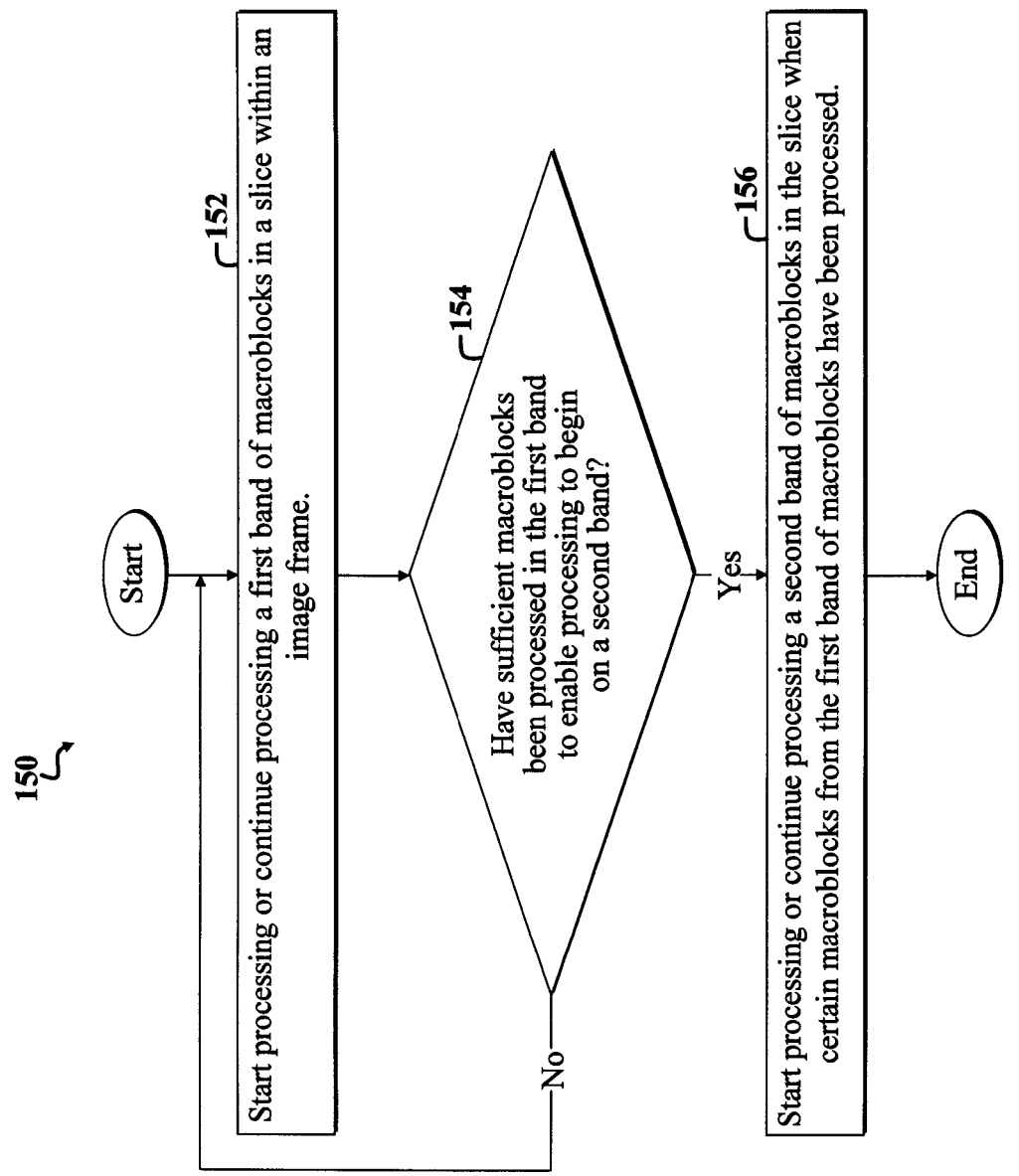
FIG. 9 is a flow diagram of a method suitable for use with the encoding module and the inter/intra processing module of FIG. 1-3.

FIG. 9 is a flow diagram of a method 150 suitable for use with the encoding module 20 and accompanying inter/intra processing module 50 of FIG. 1-3. In a first step 152, the method 150 includes starting processing or continuing to process a first band of macroblocks in a slice within an image frame.

A second step 154 determines whether sufficient macroblocks in the first band have been processed to enable processing to begin or to continue on a second band of macroblocks. If sufficient macroblocks, as determined based on one or more predetermined criteria, in the first band of macroblocks have been processed, a third step 156 is performed. Otherwise, the first step 152 continues.

The third step 156 includes starting processing or continuing to process a second band of macroblocks in the slice.

Although embodiments of the invention are discussed primarily with respect to an H.264-compliant encoder, embodiments of the present invention may be adapted to any video encoder wherein parallel engines or a pipelined engine may be useful to process macroblocks in a frame. Furthermore, any acceptable architecture, topology, protocols, or other network and digital processing features can be employed. In general, certain modules and components discussed herein can be implemented in hardware, software, or via any device with processing ability or other requisite functionality. Techniques described herein may be suitable for use with other types of information processing. For example, the processing can operate on previously compressed or encoded image information, on three-dimensional image data, on non-visual information, etc.

Although specific processing sequences have been provided for processing data such as macroblocks, sub-blocks, slices, etc., any other suitable processing order or approach may be used. For example, any number of contiguous macroblocks may be in a slice. A slice can be a horizontal band but can also span horizontal bands, or be oriented vertically, diagonally, or in other non-horizontal directions.

Arrowheads shown on signal paths between various modules are for illustrative purposes only. For example, various communication paths or connecting lines, which appear to be unidirectional in the drawings, may be bidirectional without departing from the scope of the present invention.

Although processes of the present invention and the hardware executing the processes may be characterized by language common to a discussion of video processing (e.g., "FPGA," "CABAC," etc.), it should be apparent that operations of an embodiment of the present invention can execute on any type of suitable hardware in any communication relationship to another device on any type of link or network.

Although a process of the present invention may be presented as a single entity, such as software or hardware executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a transformation program and a quantization program, can be executing in a single module, or in different modules.

Although the invention has been discussed with respect to specific example embodiments thereof, these embodiments are merely illustrative, and not restrictive, of the invention. In the description herein, numerous specific details are provided, such as examples of components and/or methods, to provide a thorough understanding of discussed example embodiments. One skilled in the relevant art will recognize, however, that certain embodiments can be practiced without one or more of the specific details, or with other apparatus, systems, assemblies, methods, components, materials, parts, and/or the like. In other instances, well-known structures, materials, or operations are not specifically shown or described in detail to avoid obscuring aspects of the example embodiments discussed herein.

A "machine-readable medium" or "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an example embodiment", or "a specific embodiment" means that a particular feature, structure, or characteristic described in connection with the embodiment not necessarily included in all possible example embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment or example embodiment discussed herein may be combined in any suitable manner with one or more other embodiments. It is to be understood that other variations and modifications of the embodiments described and illustrated herein are possible in light of the teachings herein, and the variations are to be considered as part of the spirit and scope of the present invention.

Example embodiments discussed herein may be implemented in whole or in part by using a programmed general purpose digital computer; by using application specific integrated circuits, programmable logic devices, FPGAs, optical, chemical, biological, quantum or nanoengineered systems or mechanisms; and so on. In general, the functions of various embodiments can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

As used in the description herein and throughout the claims that follow "a", an and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated example embodiments, including what is described in the Abstract, is not intended to be exhaustive or to limit the invention to the precise forms disclosed herein. While certain example embodiments are described herein for illustrative purposes only, various equivalent modifications are possible within the spirit and scope of the present invention, as those skilled in the relevant art will recognize and appreciate. As indicated, these modifications may be made in light of the foregoing description of illustrated example embodiments and are to be included within the spirit and scope of the present invention.

Thus, while example embodiments have been described herein, a latitude of modification, various changes and substitutions are intended in the foregoing disclosures, and it will be appreciated that in some instances some features of embodiments will be employed without a corresponding use of other features without departing from the scope and spirit of the invention. Therefore, many modifications may be made to adapt a particular situation or material to the essential scope and spirit of the present invention. It is intended that the invention not be limited to the particular terms used in following claims and/or to a particular embodiment disclosed as the best mode contemplated for carrying out this invention, but that the invention will include any and all embodiments and equivalents falling within the scope of the appended claims.

What is claimed is:

1. A system for processing image information into macroblocks, the system comprising:
    a first processing engine for generating a first macroblock by using a first data and for generating a next macroblock by using next data;
    a second processing engine for generating a second macroblock by using a second data and the first macroblock to predict values for the second macroblock, wherein generation of the second macroblock is concurrent, at least in part, with the first processing engine's generating the next macroblock; and
    a demultiplexer to dispatch the first macroblock to the first processing engine and the second macroblock to the second processing engine, wherein the first macroblock and the second macroblock are dispatched on successive clock ticks and wherein the processing of the second macroblock is selectively offset to meet the processing dependency of the second macroblock;
    wherein clocks of the first processing engine, the second processing engine and the demultiplexer and synchronized for each frame using a synchronization tick, wherein subsequent clock ticks coincide with dispatching of the macroblocks.

2. The system of claim 1, wherein the first macroblock and the second macroblock are within a slice of an image frame.

3. The system of claim 1, wherein the first processing engine and the second processing engine comprise at least one stage in a pipelined processor.

4. A method for processing image information into macroblocks the method comprising:
    using a first processing engine to generate a first macroblock by using a first data;
    generating a next macroblock by using the first processing engine while concurrently using a second processing engine to generate a second macroblock by using a second data and the first macroblock, wherein using the first macroblock comprises using the first macroblock to make predictions for values within the second macroblock and processing the next macroblock dispatched for processing on successive clock ticks and wherein the processing of the next macroblock is selectively offset to meet the processing dependency of the next macroblock;

wherein clocks of the first processing engine, the second processing engine and a demultiplexer and synchronized for each frame using a synchronization tick, wherein subsequent clock ticks coincide with dispatching of the macroblocks.

5. The method of claim 4, wherein the first macroblock and the second macroblock are within a slice of an image frame.

6. The method of claim 5, wherein the slice includes a first row of macroblocks and a second row of macroblocks, wherein the first macroblock is from the first row, and wherein the second macroblock is from the second row.

7. The method of claim 5, wherein the slice includes a first row pair of macroblocks and a second row pair of macroblocks, wherein the first macroblock is from the first row pair, and wherein the second macroblock is from the second row pair.

8. The method of claim 4, further comprising: providing at least a portion of the first macroblock to the second processing engine while the first processing engine is processing image information into a third macroblock.

9. The method of claim 4, further comprising intra prediction for a macroblock.

10. A method comprising:
processing, by first processing engine, a first band of macroblocks in a slice within an image frame;
processing, by second processing engine, a second band of macroblocks in the slice, before the first band of macroblocks is completely processed, when certain macroblocks from the first band of macroblocks have been processed, the processed macroblocks from the first band being used to make predictions for pixels in the second band of macroblocks in the slice and
wherein the processed macroblocks from the first band of macroblocks and the second band of macroblocks are dispatched for processing on successive clock ticks, and wherein the processing of the macroblocks from the second band of macroblock is selectively offset to meet the processing dependency of the second band of macroblocks;
wherein clocks of the first processing engine, the second processing engine and a demultiplexer and synchronized for each frame using a synchronization tick, wherein subsequent clock ticks coincide with dispatching of the macroblocks.

11. The method of claim 10, wherein the certain macroblocks are determined based on at least one criterion.

12. The method of claim 11, wherein the at least one criterion comprises: an availability of a processed macroblock directly above the second macroblock in the first band of macroblocks.

13. The method of claim 12, wherein the at least one criterion comprises: an availability of a macroblock diagonally adjacent above and left of the second macroblock and a macroblock diagonally adjacent above and to the right of the second macroblock.

14. The method of claim 10, wherein the first row of macroblocks and the second row of macroblocks includes: at least one row pair of macroblocks.

15. The method of claim 10, wherein processing comprises: performing intra prediction on at least one macroblock.

16. The method of claim 15, wherein performing comprises: computing at least one motion search vector for a macroblock.

17. A non-transitory computer-readable medium having a set of instructions which when executed performs a method comprising:
processing, by first processing engine, a first row of macroblocks;
providing first processed information in response to processing the first row of macroblocks, the processed information being used to make predications for a second row of macroblocks;
processing, by second processing engine, the second row of macroblocks based on an availability of the first portion of the first row of macroblocks; and
providing second processed information in response to processing the second row of macroblocks;
wherein the macroblocks from the first row and the second row are dispatched for processing on successive clock ticks and wherein the processing of the macroblocks from the second row is selectively offset to meet the processing dependency of the second macroblock;
wherein clocks of the first processing engine, the second processing engine and a demultiplexer and synchronized for each frame using a synchronization tick, wherein subsequent clock ticks coincide with dispatching of the macroblocks.

18. The non-transitory computer-readable medium of claim 17, wherein the processing comprises a pipelined processor.

19. The non-transitory computer-readable medium of claim 17, wherein the processing comprises at least one parallel engine.

* * * * *